United States Patent
Luchinskiy et al.

(10) Patent No.: US 6,841,891 B1
(45) Date of Patent: Jan. 11, 2005

(54) ELECTROGASDYANAMIC METHOD FOR GENERATION ELECTRICAL ENERGY

(76) Inventors: Alexander Luchinskiy, Gymnasialstrasse 11, D-55543 Bad Kreuznach (DE); Günther Werth, Carl-Orff-Strasse 37, D-55127 Mainz (DE); Yakov Shifrin, Apartment 80, Kozmicheskaya Straase 4, 310145 Charkov (UA)

(*) Notice: Subject to any disclaimer, the term of this patent is extended or adjusted under 35 U.S.C. 154(b) by 0 days.

(21) Appl. No.: 10/656,674

(22) Filed: Sep. 4, 2003

Related U.S. Application Data

(63) Continuation of application No. 09/830,017, filed as application No. PCT/DE99/03389 on Oct. 21, 1999, now abandoned.

(30) Foreign Application Priority Data

Oct. 22, 1998 (DE) .......................................... 19848852

(51) Int. Cl.[7] .................................................. F02G 1/00
(52) U.S. Cl. ............................. 290/2; 290/52; 60/517; 60/641.8
(58) Field of Search ................................ 290/1 R, 1 A, 290/2, 52; 60/517, 641.8, 641.11

(56) References Cited

U.S. PATENT DOCUMENTS

| | | | |
|---|---|---|---|
| 3,225,225 A | 12/1965 | Wattendorff et al. | 310/6 |
| 3,518,461 A | 6/1970 | Marks | 310/10 |
| 3,582,694 A | 6/1971 | Gourdine | 310/10 |
| 3,612,923 A | 10/1971 | Collier et al. | 310/10 |
| 3,638,054 A | 1/1972 | Honigsbaum | 310/10 |
| 3,651,354 A | 3/1972 | Cowan | 310/10 |
| 3,842,596 A * | 10/1974 | Gray | 60/736 |
| 3,956,895 A * | 5/1976 | Noble et al. | 60/516 |
| 4,057,963 A * | 11/1977 | Basiulis | 60/641.7 |
| 4,090,359 A | 5/1978 | Doellner | 60/722 |
| 4,186,559 A | 2/1980 | Decker et al. | 60/531 |
| 4,206,396 A | 6/1980 | Marks | 322/2 A |
| 4,433,248 A | 2/1984 | Marks | 290/44 |
| 4,622,472 A * | 11/1986 | Bronicki | 290/52 |
| 4,698,973 A * | 10/1987 | Johnston | 60/670 |
| 4,785,633 A * | 11/1988 | Meijer et al. | 60/641.15 |
| 4,876,854 A * | 10/1989 | Owens | 60/641.8 |
| 4,897,997 A * | 2/1990 | Meijer et al. | 60/517 |
| 4,910,963 A | 3/1990 | Vanzo | 60/641 |
| 4,947,825 A | 8/1990 | Moriarty | 126/685 |
| 5,185,541 A | 2/1993 | Jensen | 310/10 |
| 5,899,071 A | 5/1999 | Stone et al. | 60/641.8 |
| 6,311,476 B1 | 11/2001 | Frye et al. | 60/203.1 |
| 6,574,963 B1 * | 6/2003 | Tadayon et al. | 60/651 |
| 6,735,946 B1 * | 5/2004 | Otting et al. | 60/641.11 |

FOREIGN PATENT DOCUMENTS

| | | |
|---|---|---|
| DE | 23 36 487 | 2/1975 |
| EP | 0 229 843 | 7/1987 |
| EP | 0 366 591 | 5/1990 |

* cited by examiner

Primary Examiner—Nicholas Ponomarenko
(74) Attorney, Agent, or Firm—Coudert Brothers LLP

(57) ABSTRACT

A process is provided for producing electrical energy from thermal energy in which charges are separated between two working media triboelectrically or electrostatically, the charges are moved away from one another by displacement of the working media under the action of gas flow forces. In the process, these gas flow forces perform work against the Coulomb forces, and the charges are routed onto electrodes. The process steps are carried out within the inside volume of a heat pipe, with charge separation and charge displacement taking place using the directed gas flow within the heat pipe. The gas flow entrains a liquid medium and routes it past the other working medium for charge separation and displacement. An application of the present invention is in the use of solar energy.

10 Claims, 5 Drawing Sheets

ELECTROGASDYANAMIC METHOD FOR GENERATION ELECTRICAL ENERGY

CROSS-REFERENCE TO RELATED APPLICATION

This application is a continuation of U.S. Ser. No. 09/830,017 filed Jul. 27, 2001 now abandoned and claims priority benefits under Title 35, U.S. Code §119 to PCT/DE99/03389 filed Oct. 21, 1999, published as WIPO Publication No. WO 00/25414 on May 4, 2000, which claims the priority benefits to German Patent Application DE 198 48 852.1, filed Oct. 22, 1998, now granted as European Patent No. EP 1123578 on Aug. 28, 2002 for the following 19 Countries: AT, BE, CH, CY, DE, DK, ES, FI, FR, GB, GR, IE, IT, LI, LU, MC, NL, PT, SE.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a process for generating voltages by mechanical displacement of electrical charges. More particularly, the charges between two working media are separated by triboelectrification or by induced static electricity, one of the two media being electrically connected to an electrode and the second working medium being transferred to another electrode on which the charge is picked up.

(2) Description of Related Art

Devices used in the process of the present invention; see DE 23 36 487 A1 and European Patent Application 0229 843 A1 for a description of a prior art electrostatic generator.

A process is known for producing electrical energy by friction of certain stiff dielectric surfaces consisting of different materials against one another, and it is accomplished in a compact device; see European Patent Application 0366591 A1.

The prior art devices which can be used for carrying out the present invention are characterized by the possibility of generating electrical high voltage (up to 15–20 MV), by a low current (up to 10 mA), therefore also by low power. The power of these devices is limited on the one hand by the maximum allowable surface density of charges on a conveyor, the carrier of the charge, on the one hand, and by the speed of mechanical movement of this charge conveyor.

The charge density for its part is limited by the formation of an electrical discharge on the dielectric surface. The speed of the charge conveyor is limited by the mechanical motion possibilities of the parts of the prior art devices.

The efficiency of these prior art devices are determined mainly by the aerodynamic losses as the charge conveyor is moved mechanically and by the friction of the mechanical system parts among one another. In existing prior art devices this is not greater than 15–20%.

SUMMARY OF THE INVENTION

The object of the process of the presently claimed invention is to increase the power and the efficiency of the prior art devices and to enable conversion of the thermal energy into electrical energy.

In the process of the present invention for producing electrical energy, charges are separated between two working media triboelectrically or electrostatically in an electrostatic generator and are moved away from one another by displacement of the working media under the action of gas flow forces. The gas flow forces perform work against the Coulomb force, and the charges are routed onto electrodes. The process steps are carried out within the inside volume of a heat pipe with the charge separation and charge displacement taking place using the directed gas flow of the heat pipe. The gas flow entrains one working medium of the electrostatic generator and routes it past the other working medium for charge separation and displacement. One source of the thermal energy is the use of solar energy.

The advantages which are achieved with the process of the present invention consist especially in enabling the use of thermal energy of any heater for its direct conversion into electrical energy, high output power and high efficiency.

As a result of the properties of heat pipes, a relatively small temperature difference between vaporizer and condenser sections is sufficient to achieve a high flow velocity of the gaseous working medium of the heat pipes and consequently also high kinetic energy. By means of this kinetic energy, the indicated flow causes triboelectrification of the working media of the electrostatic generator and mechanical separation of charges. In the devices which implement this process thus there are no mechanically moving parts, for which reason all losses of power and efficiency which occur for this reason are prevented. Moreover, in this case the drive of the electrostatic generator does not take place by external mechanical work, but by thermal energy which can even be removed from a small temperature difference.

BRIEF DESCRIPTION OF THE SEVERAL VIEWS OF THE DRAWINGS

The embodiments of the process are shown in the drawings and are detailed below.

DETAILED DESCRIPTION OF THE INVENTION

Figure 1:
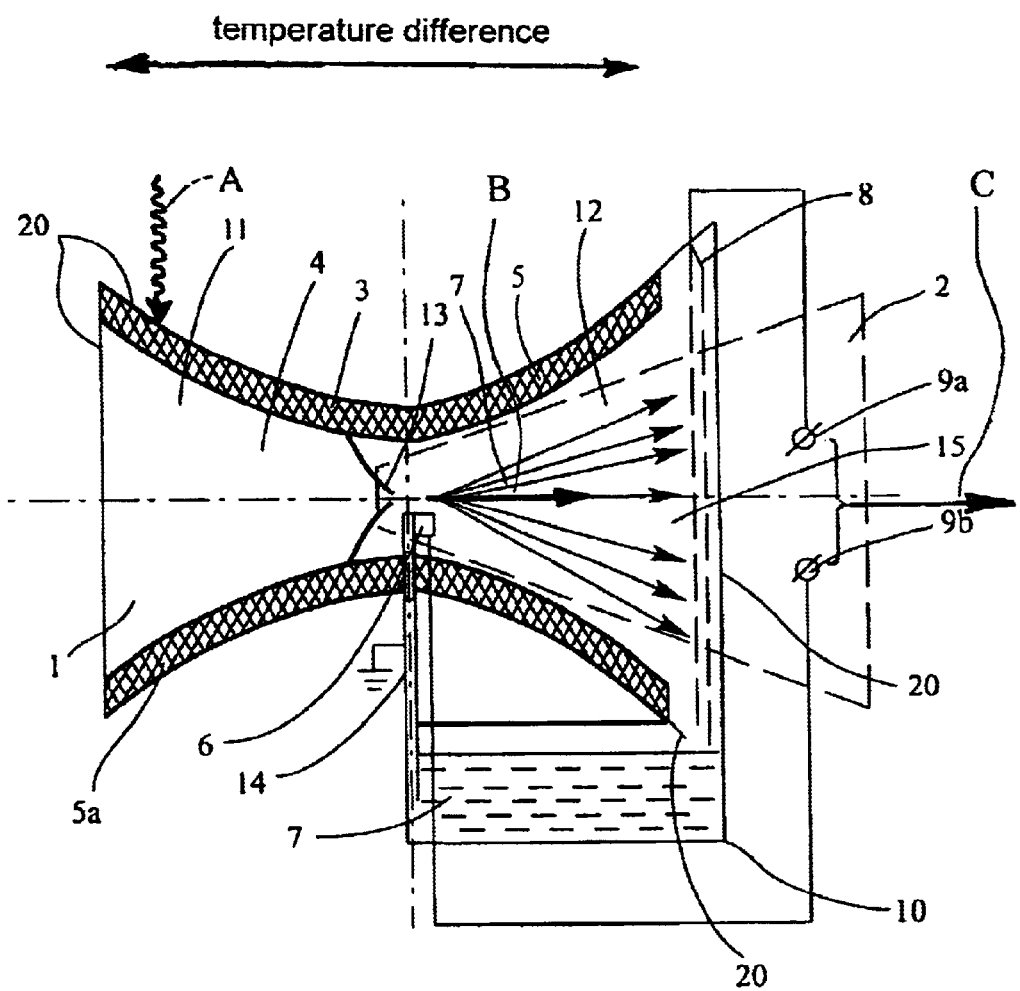
FIG. 1 shows an embodiment of the process of the present invention using a fixed device with its indicated orientation in the gravitational field.

All types of devices for enablement of the process of the present invention contain a heat pipe 1 and a generator 2. The heat pipe has a working medium in the liquid phase, i.e., the working liquid 3 which is vaporized to the gaseous phase, i.e., the working gas 4, and a capillary insert 5. The generator 2 contains the solid working medium 6 of the generator 2, the liquid working medium 7 of the generator 2, the pick-up electrode (grid) 8 for charge pick-up, the external electrodes 9a and 9b and the loop 10 for return of the liquid working medium 7.

When a temperature gradient builds up between the vaporizer 11 and the condenser 12 of the heat pipe 1, the working liquid 3 of the heat pipe, vaporizes in the vaporizer on its capillary structure 5a. At the same time the working gas 4 of the heat pipe 1 condenses on the capillary structure 5a of the capillary insert 5 of the condenser 12 of the heat pipe 1. The working liquid 3 travels via the capillary insert 5 out of the condenser 12 back into the vaporizer 11.

It is necessary for the operation of the process of the present invention that the latent heat of vaporization in the first phase of the process is supplied to the working liquid 3 in vaporizer 11 of the heat pipe and the resulting working vapor is removed from vaporizer 11 and flows to condenser 12 during the second phase. This process can also be carried out at a very small temperature difference.

The volume of the working liquid 3 of the heat pipe in the vaporizer 11 increases suddenly and as a result the pressure of the working gas 4 in the vaporizer 11 does likewise. The volume and the pressure of the working gas 4 of the heat pipe in the condenser 12 decrease equally suddenly.

Thus, for a small temperature difference in a closed space during the two phases of the process, the increase and decrease of the gas pressure take place simultaneously and uninterruptedly in this closed space; these phases of the process are spatially separated, proceed with different signs, and are explosive according to their physical properties. This leads to formation of a high speed gas flow from the vaporizer into the condenser. In doing so, the thermal energy A which is supplied to the heat pipe is converted into kinetic energy of the molecules in the gas flow B and can be converted further into other types of energy, for example, into electrical energy C.

The solid working medium 6 and the liquid working medium 7 of the generator 2 are accommodated within the heat pipe 1, roughly at the location of the maximum flow of the working gas 4 of the heat pipe, directly behind the diaphragm 13. The diaphragm 13 concentrates the gas flow from the vaporizer 11 into the condenser 12. The solid working medium 6 is fixedly attached with respect to the heat pipe and is connected to electrode 9b.

The liquid working medium 7 is supplied to the interior of the heat pipe via the feeder 14, charge separation and charge displacement taking place using the directed gas flow of the heat pipe, which flow entrains liquid droplets and routes them past the other working medium 6 resulting in charge separation and displacement.

Subsequently the charge is picked up on the external electrode 9a connected to grid 8, quite analogously to the manner in which this takes place in electrostatic generators with solid media.

Figure 2:
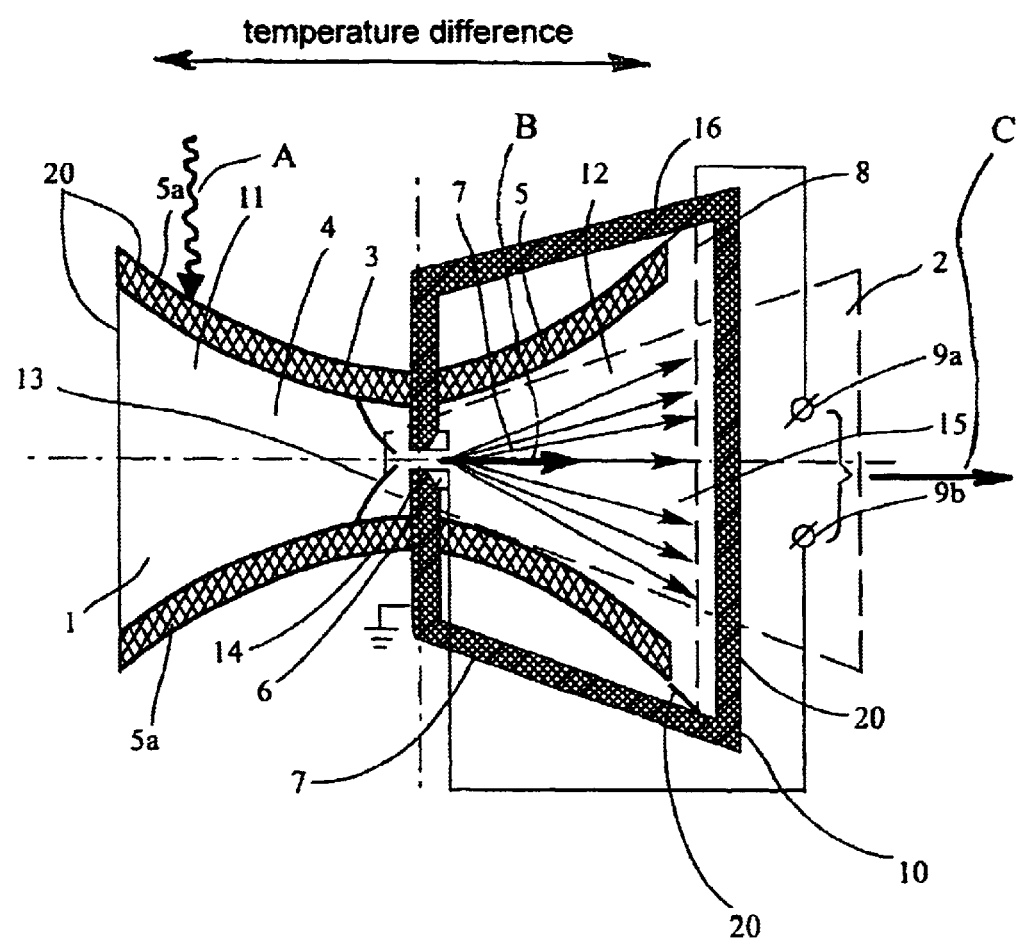
FIG. 2 shows an embodiment of the process of the present invention using a device which can function at different orientations, in a gravitational field, and also in weightlessness.
Figure 5:
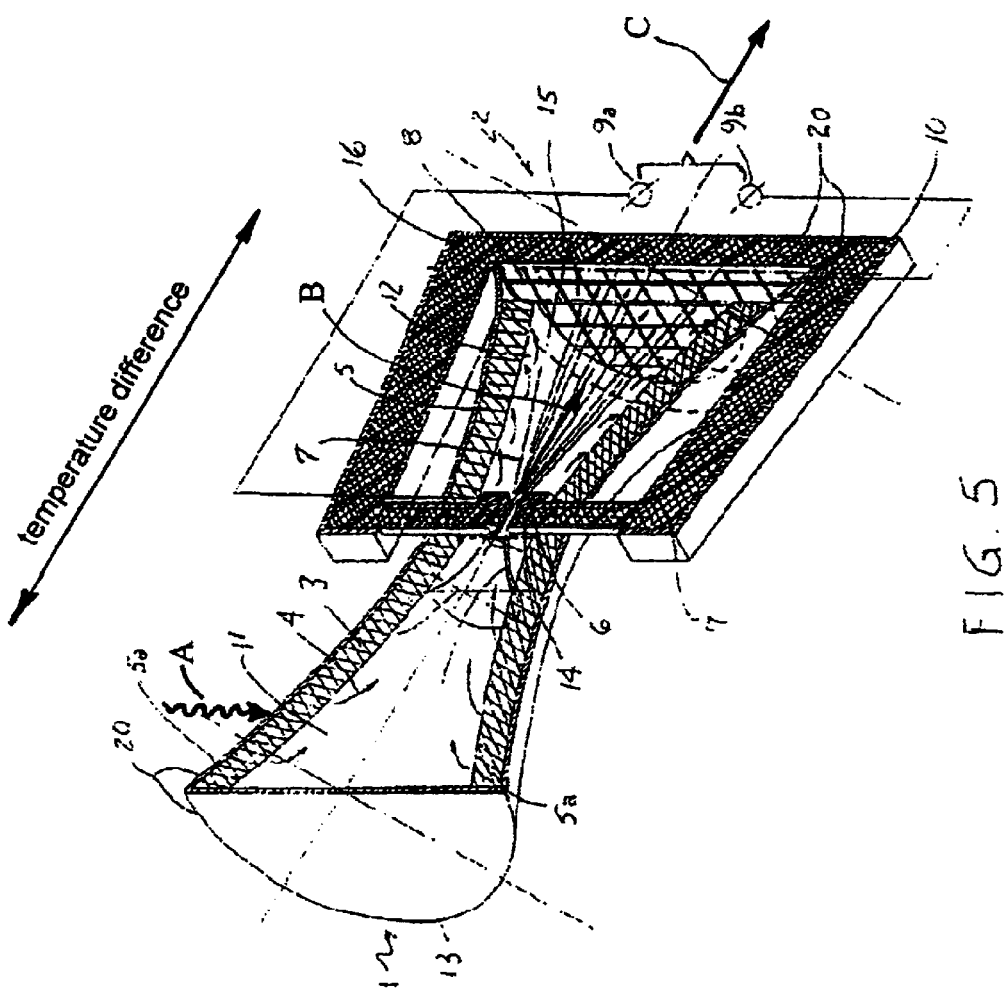
FIG. 5 shows an isometric view of the embodiment shown in FIG. 2.

In one version of operating the process of the present invention shown in FIGS. 2 and 5, the loop 10 for return of the liquid working medium 7 of the generator 2 is filled with a capillary structure 16. This makes it possible for the device to work regardless of its location in the gravitational field, and also in weightlessness. Here the open surface of the aforementioned capillary structure 16 is housed directly behind the grid of the pick-up electrode 8.

Figure 3:
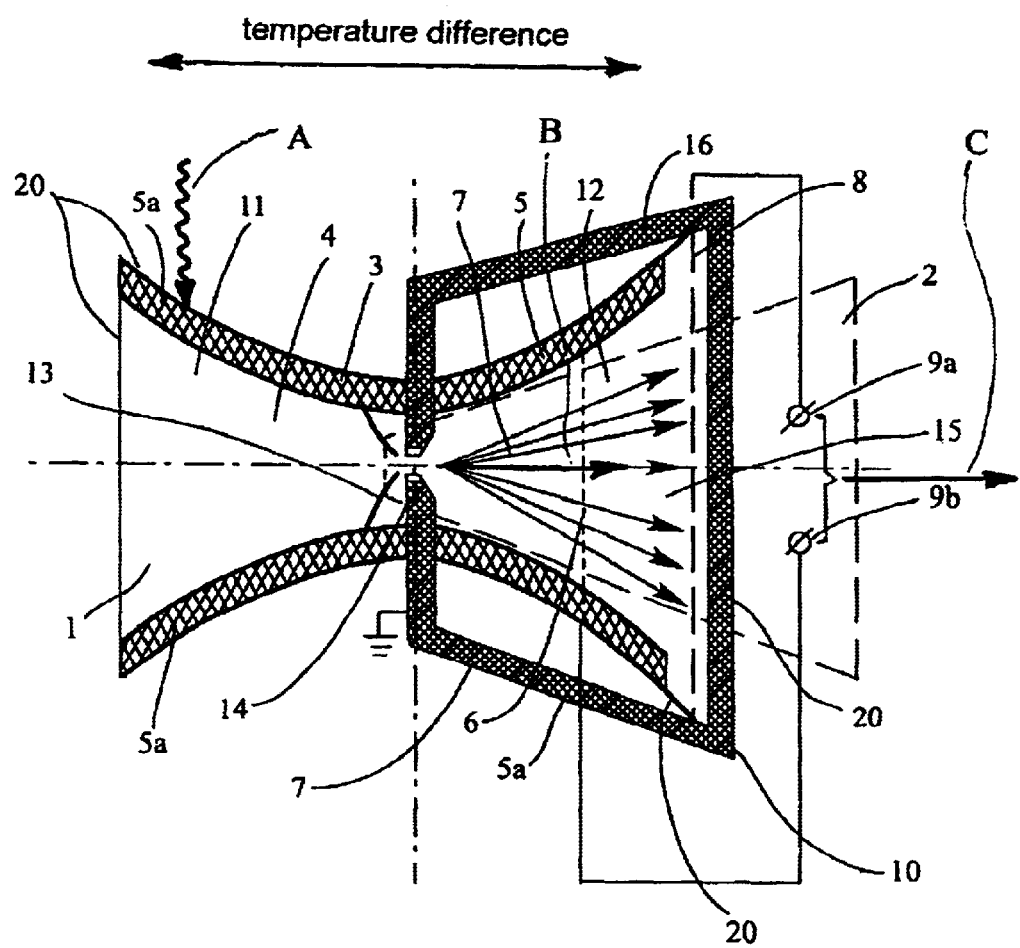
FIG. 3 shows an embodiment of the process of the present invention in which the working liquid of an electrostatic generator is not electrified at the site of its detachment from the mouth of a feeder nozzle, but at some distance from it by the breakdown of the liquid droplets when they suddenly encounter the grid.
Figure 4:
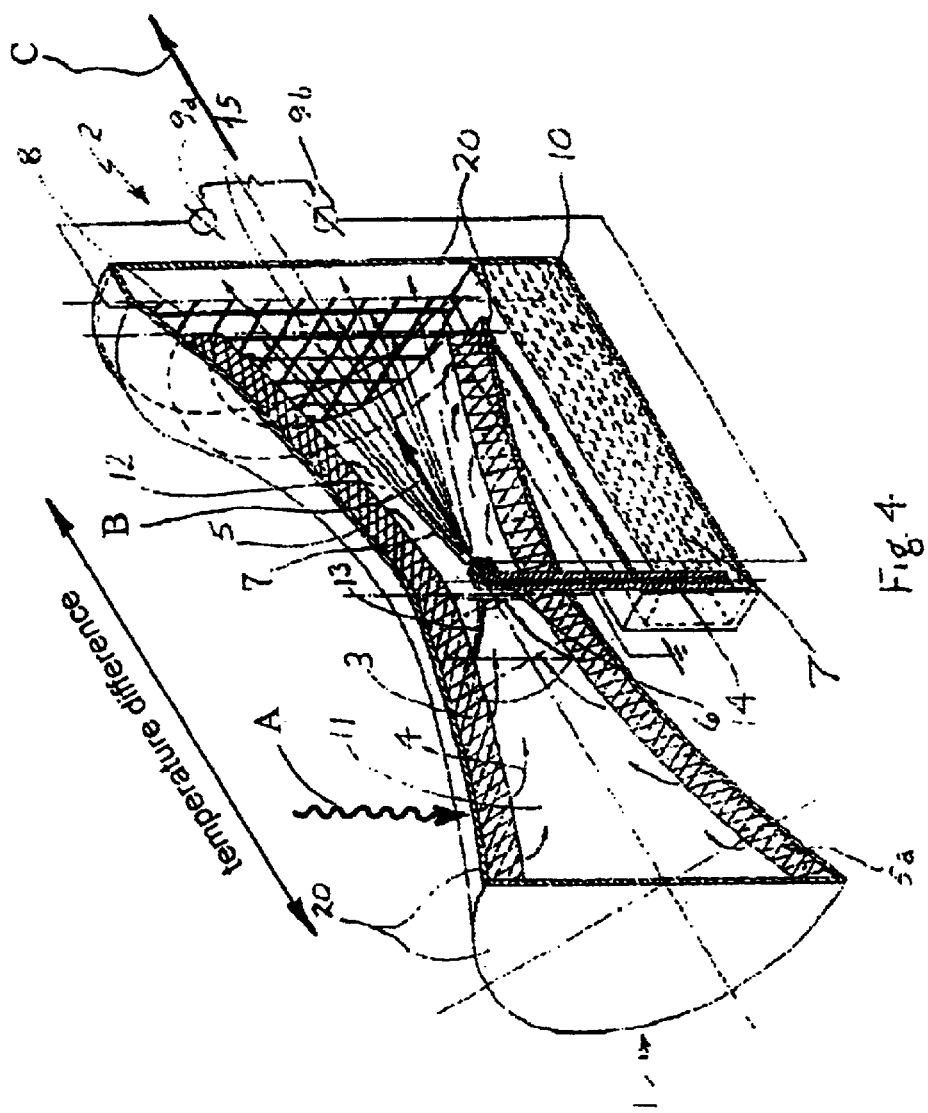
FIG. 4 shows an isometric view of the embodiment shown in FIG. 1.

In the embodiments of other versions of the process of the present invention shown in FIG. 3, charge separation takes place by the liquid 7 striking the medium 6. Here the medium 6 has the shape of for example a grid. In this case the solid working medium 6 is located at some distance from the insertion site of the feeder 14 into the interior of the heat pipe as shown in FIG. 3. The droplets of the medium 7 before striking the medium 6 acquire a certain kinetic energy which is expended for charge separation. After impact the charged droplets are carried on further with the gas flow of the heat pipe 4 to the pick-up electrode 8.

The gases which are not condensing and which remain in the heat pipe (for example, air and also vapors of the working liquid 7 of the generator 2, which in a closed space, are inevitably combined with the liquid 7, which has a free surface) are pushed away by the working gas 4 of the heat pipe to one of the ends of the pipe in the first seconds of operation of the heat pipe, and form a gas cushion 15.

In the geometry of the heat pipe and the electrode 8 for the charge pick-up (FIGS. 1-5), this gas cushion 15 to a certain extent thermally insulates the pick-up electrode 8 and the wall 20 of the heat pipe adjoining it. Therefore, the temperature of the pick-up electrode 8 generally differs from the temperature of the capillary structure 5a of the condenser 12 of the heat pipe.

Since the insertion site of the feeder 14 into the heat pipe is outside of the vaporizer 11, the same liquid can be used for the working liquid of the heat pipe and of the generator.

What is claimed is:

1. A process for producing electrical energy from thermal energy comprising the steps of:

supplying thermal energy to a heat pipe containing a working fluid and a capillary insert to evaporate the working fluid in a vaporizer section of the heat pipe;

directing the resulting vapor flow through the heat pipe to a condenser section of the heat pipe where the vapor is condensed and the resulting condensate returned to the vaporizer section via the capillary insert;

entraining liquid droplets of an electrostatic generator by means of the vapor flow from the vaporizer section of the heat pipe, the electrostatic generator having a liquid working medium to supply the liquid droplets, a solid working medium for charge separation, and a pick-up electrode within the condenser section of the heat pipe;

passing the vapor entrained with the liquid droplets by the solid working medium to cause separation of the electrostatic charges between the solid and liquid working media;

displacing of the resulting charged liquid droplets-working medium under the action of forces caused by the kinetic energy of the molecules in the vapor flow, wherein these vapor flow forces perform work against the Coulomb forces; and passing the liquid droplets-working medium past the pick-up electrode to pick up electric charges that are mechanically displaced by the these vapor flow forces against the Coulomb forces to generate electrical energy from the thermal energy.

2. The process of claim 1, wherein said electrostatic generator also has a first external electrode connected to said solid working medium and a second external electrode connected to said pick-up electrode.

3. The process of claim 2, wherein the pick-up electrode is a grid.

4. The process of claim 3, wherein the solid working medium comprises a second grid through which the vapor entrained with liquid droplets passes.

5. The process of claim 1, wherein a diaphragm of separates the vaporizer section from the condenser section to create an area of maximum flow velocity.

6. The process of claim 5, wherein the solid working medium is located within the heat pipe substantially at the position of the maximum flow velocity.

7. The process of claim 1, wherein the liquid droplets are recovered and fall by gravity into a loop return and are returned to be entrained by means of the vapor.

8. The process of claim 1, wherein the liquid droplets are recovered through a loop return containing a capillary insert and are returned to be retained by means of the vapor.

9. The process of claim 1, wherein the same liquid is used as the fluid in the heat pipe and as the working liquid medium of the generator.

10. The process of claim 1, wherein the thermal energy is solar energy.

* * * * *

UNITED STATES PATENT AND TRADEMARK OFFICE
CERTIFICATE OF CORRECTION

PATENT NO. : 6,841,891 B1
DATED : January 11, 2005
INVENTOR(S) : Luchinsky et al.

It is certified that error appears in the above-identified patent and that said Letters Patent is hereby corrected as shown below:

<u>Title page, Item [54] and Column 1, line 1</u>,
Title, should read as follows:
-- ELECTROGASDYNAMIC METHOD FOR GENERATION ELECTRICAL ENERGY --

Signed and Sealed this

Nineteenth Day of April, 2005

JON W. DUDAS
*Director of the United States Patent and Trademark Office*